US011481822B2

(12) United States Patent
Lowell et al.

(10) Patent No.: US 11,481,822 B2
(45) Date of Patent: *Oct. 25, 2022

(54) SYSTEMS AND METHODS FOR IMPROVING INVOICE MANAGEMENT USING ENHANCED ANALYTICAL INSIGHT

(71) Applicant: Capital One Services, LLC, McLean, VA (US)

(72) Inventors: Eric Lowell, Glen Allen, VA (US); Brandon Walsh, Midlothian, VA (US); Meredith Van Voorhis, Midlothian, VA (US); Paola Thurlow, Powhatan, VA (US); Sehyoung Myung, Vienna, VA (US); Qiang Xue, Vienna, VA (US); Heather Aller, Herndon, VA (US); Kristofer Johnson, Glen Allen, VA (US); Michael Baird Beers, Richmond, VA (US); Chad Fisher, Ashland, VA (US); Mark Lareau, Henrico, VA (US); Karthik Kaimal, Richmond, VA (US); Victor Mayaki, Aldie, VA (US)

(73) Assignee: Capital One Services, LLC, McLean, VA (US)

( * ) Notice: Subject to any disclaimer, the term of this patent is extended or adjusted under 35 U.S.C. 154(b) by 414 days.

This patent is subject to a terminal disclaimer.

(21) Appl. No.: 16/547,101

(22) Filed: Aug. 21, 2019

(65) Prior Publication Data

US 2019/0378183 A1 Dec. 12, 2019

Related U.S. Application Data

(63) Continuation of application No. 15/966,949, filed on Apr. 30, 2018, now Pat. No. 10,395,287.

(51) Int. Cl.
*G06Q 30/04* (2012.01)
*G06Q 10/06* (2012.01)
(Continued)

(52) U.S. Cl.
CPC ....... *G06Q 30/04* (2013.01); *G06Q 10/06316* (2013.01); *G06F 16/26* (2019.01); *G06Q 40/025* (2013.01)

(58) Field of Classification Search
CPC . G06Q 30/04; G06Q 10/06316; G06Q 40/025
See application file for complete search history.

(56) References Cited

U.S. PATENT DOCUMENTS 8,666,854 B2 3/2014 Usmani et al.
8,903,741 B2 12/2014 Imrey et al.
(Continued)

OTHER PUBLICATIONS

Invoice Factoring Examples https://web.archive.org/web/20150109114907/https://www.comcapfactoring.com/blog/a-receivables-factoring-example/ Jan. 2015 (Year: 2015).*

*Primary Examiner* — Allen C Chein
(74) *Attorney, Agent, or Firm* — DLA Piper LLP US

(57) ABSTRACT

An improved invoice management product may include an invoice hub server and an invoice database, and may receive data including one or more invoices, transmit one or more invoice records to an invoice database, identify one or more invoice records for expedited processing, transmit a request to issue an advance payment to a supplier associated with one or more supplier identifiers associated with the one or more invoice records, and transmit a notice to a customer. An Invoice Hub server may receive data comprising one or more invoices, create one or more invoice records based on the one or more invoices, transmit the one or more invoice records to an invoice database, identify one or more invoice records for expedited processing, transmit a request to issue an advance payment to a supplier, and transmit a notice to a customer associated with the one or more invoice records.

18 Claims, 9 Drawing Sheets

(51) Int. Cl.
*G06F 16/26* (2019.01)
*G06Q 40/02* (2012.01)

(56) References Cited

U.S. PATENT DOCUMENTS

| | | |
|---|---|---|
| 9,277,526 B2 | 3/2016 | Qiu et al. |
| 9,578,043 B2 | 2/2017 | Mawji et al. |
| 9,779,432 B1 | 10/2017 | Shearer et al. |
| 9,824,198 B2 | 11/2017 | Carroll et al. |
| 9,892,458 B1 | 2/2018 | Shearer et al. |
| 9,916,621 B1 | 3/2018 | Wasser et al. |
| 10,055,769 B1 | 8/2018 | Todd et al. |
| 2004/0172360 A1 | 9/2004 | Mabrey et al. |
| 2007/0174191 A1* | 7/2007 | Keaton .............. G06Q 40/04 705/40 |
| 2009/0254477 A1* | 10/2009 | Kramer .............. G06Q 40/00 705/40 |
| 2010/0049650 A1 | 2/2010 | Keaton et al. |
| 2012/0173481 A1 | 7/2012 | Poth et al. |
| 2015/0026036 A1 | 1/2015 | Bloomston |
| 2015/0324715 A1 | 11/2015 | Nelson et al. |
| 2018/0040064 A1* | 2/2018 | Grigg ................. H04L 41/147 |

\* cited by examiner

SYSTEMS AND METHODS FOR IMPROVING INVOICE MANAGEMENT USING ENHANCED ANALYTICAL INSIGHT

CROSS-REFERENCE TO RELATED APPLICATIONS

This is a continuation of U.S. application Ser. No. 15/966,949, filed Apr. 30, 2018, the content of which is hereby incorporated by reference in its entirety.

TECHNICAL FIELD

The present disclosure relates generally to methods and systems for improving the management of electronic invoices.

BACKGROUND

Small and medium sized businesses (SMB) often struggle to find affordable financing options. Existing solutions are often hard to obtain and may incur significant borrowing costs to SMBs. Financial solutions offered by various financial institutions typically carry effective annual percentage rates (APR) of 10% to 70%, or even higher APRs. Many of the financial institutions offering financial solutions may require payment of additional fees (e.g., account fees), even if a financial solution is not being utilized by an SMB. The financing problem for SMBs may be magnified, as large companies often use market power and market influences to push out the payment terms that they offer to their suppliers. When payment terms are extended, suppliers may be forced to seek and find additional financing to cover the supplier's expenses for payment terms that have become extended, often to a significant degree.

There exists financial solutions for SMBs to obtain financing for their business. Some examples of existing financial solutions include factoring of invoices, financial tech (FinTech) lenders, and supply chain finance. Factoring of invoices (also known as factoring) is a financial transaction and a type of debtor finance when a business sells its accounts receivable (e.g., invoices) to a third party, often at a discount. One significant downside of factoring of invoices products is that such products generally require factoring all invoices for a significant period of time, often one to three years. FinTech lenders are companies that focus on lending financing to companies, often startup companies. Some FinTech lenders focus on the SMB space, and typically offer loans with APRs of 25-99%. Often, additional fees and restrictions exist with these loans. Supply chain finance (SCF) is a product similar to FinTech lenders, and often provides attractive pricing, but generally has more limited availability for SMBs. One downside of supply chain finance is that SMBs often need to log into each SCF system separately in order to check invoices that are available for financing.

SUMMARY OF THE DISCLOSURE

Systems and methods for providing technological improvements and solutions in invoice management include an unconventional Invoice Hub server providing improved analytical insights for facilitating invoice processing.

For example, a method for improving the management of an invoice may include receiving, at an invoice hub server, data including one or more invoices, creating, by the invoice hub server, one or more invoice records based on the one or more invoices, transmitting, by the invoice hub server, the one or more invoice records to an invoice database, identifying, by the invoice hub server, a set of the one or more invoice records for expedited processing, based on identifying the set of the one or more invoice records for expedited processing, transmitting, by the invoice hub server, a request to issue an advance payment to a supplier associated with the one or more supplier identifiers associated with the set of the one or more invoice records identified for expedited processing, transmitting an advance payment notice to a customer associated with the one or more customer names associated with the one or more invoice records identified for expedited processing.

In some embodiments, the method may include receiving, by the invoice hub server, a request for information, retrieving the one or more invoice records from the invoice database, preparing, by the invoice hub server, a customer invoice summary of the one or more invoice records, and transmitting, by the invoice hub server, the customer invoice summary.

In some embodiments, the method may include generating, by the invoice hub server, an invoice score, identifying, by the invoice hub server, an invoice score threshold, comparing, by the invoice hub server, the invoice score to the invoice score threshold; identifying, by the invoice hub server, a list of one or more responsive invoice records, and generating, by the invoice hub server, an invoice report based on the list of responsive invoice records.

In some embodiments, the method may include comparing the one or more invoice amounts associated with the one or more invoice records with an advance limit.

In some embodiments, the method may include creating, by the invoice hub server, one or more invoice business rules, comparing, by the invoice hub server, the one or more invoice records to the one or more invoice business rules, in response to comparing the one or more invoice records to the one or more invoice business rules, generating one or more additional invoice business rules, and transmitting, by the invoice hub server, an invoice payment request.

In some embodiments, the method may include, in response to transmitting the customer invoice summary to the customer, receiving, by the invoice hub server, a customer request, transmitting, by the invoice hub server, an update request to the invoice database, and transmitting, by the invoice hub server, a message to the customer.

In some embodiments, the method may include receiving, by the invoice hub server, additional data from the third party platform, transmitting, by the invoice hub server, an update request for the one or more invoice records to the invoice database, and transmitting, by the invoice hub server, a status update to the third party platform.

As another example, a system may be configured to provide improved management of an invoice. The system may include a database and an invoice hub server in communication with the database, and the invoice hub server may include a processor and a non-transitory memory, the memory storing instructions that, when executed by the processor, cause the processor to perform processing including receiving data comprising one or more invoices, creating one or more invoice records based on the one or more invoices, transmitting the one or more invoice records to a database, identifying one or more invoice records for expedited processing, flagging the one or more invoice records, transmitting a request to issue an advance payment to a supplier associated with the one or more supplier identifiers associated with the one or more flagged invoice records; and transmitting a notice to a customer associated with the one or more customer names further associated with the one or more flagged invoice records.

In some embodiments, the processing may include receiving a request from a customer for information, transmitting a request to the database, receiving the requested one or more invoice records from the database, preparing a customer invoice summary of the one or more invoice records, and transmitting the customer invoice summary to the customer.

In some embodiments, the processing may include identifying a list of one or more responsive invoice records, and generating a report based on the list of responsive invoice records.

In some embodiments, the processing may include transmitting the list of responsive invoice records to the third party platform.

In some embodiments, the processing may include creating one or more business rules, comparing the one or more invoice records to the one or more business rules, and transmitting an invoice payment request.

In some embodiments, the processing may include, in response to transmitting the customer invoice summary to the customer, receiving a customer request, transmitting an update request to the database, and transmitting a message to the customer.

In some embodiments, the processing may include receiving additional data from the third party platform, transmitting an update request for the one or more invoice records to the database, and transmitting a status update to the third party platform.

As another example, a method for improving the management of an invoice may include receiving, at an invoice hub server, data comprising one or more invoices, creating, by the invoice hub server, one or more invoice records based on the one or more invoices, transmitting, by the invoice hub server, the one or more invoice records to an invoice database, identifying one or more invoice records for expedited processing, flagging the one or more invoice records, transmitting, by the invoice hub server, a request to issue an advance payment to a supplier associated with the one or more supplier identifiers associated with the one or more flagged invoice records, and transmitting a notice to a customer associated with the one or more customer names further associated with the one or more flagged invoice records.

In some embodiments, the method may include receiving, by the invoice hub server, a request from the customer for information, transmitting, by the invoice hub server, a request to the invoice database, receiving, by the invoice hub server, the requested one or more invoice records from the invoice database, preparing, by the invoice hub server, a customer invoice summary of the one or more invoice records, and transmitting, by the invoice hub server, the customer invoice summary to the customer.

In some embodiments, the method may include creating, by the invoice hub server, one or more invoice business rules, comparing, by the invoice hub server, the one or more invoice records to the one or more invoice business rules, and transmitting, by the invoice hub server, a request to a second third party platform.

In some embodiments, the method may include, in response to transmitting the summary to the customer, receiving, by the invoice hub server, a customer request, transmitting, by the invoice hub server, an update request to the invoice database, and transmitting, by the invoice hub server, a message to the customer.

In some embodiments, the method may include receiving, by the invoice hub server, additional data from the third party platform, transmitting, by the invoice hub server, an update request for the one or more invoice records to the invoice database, and transmitting, by the invoice hub server, a status update to the third party platform.

In some embodiments, the method may include receiving a payment indicator, transmitting, by the invoice hub server, a second update request for the one or more invoice records to the invoice database, and transmitting a notice of payment to the supplier associated with the one or more supplier identifiers further associated with the one or more flagged invoice records.

DETAILED DESCRIPTION OF SEVERAL EMBODIMENTS

Figure 1:
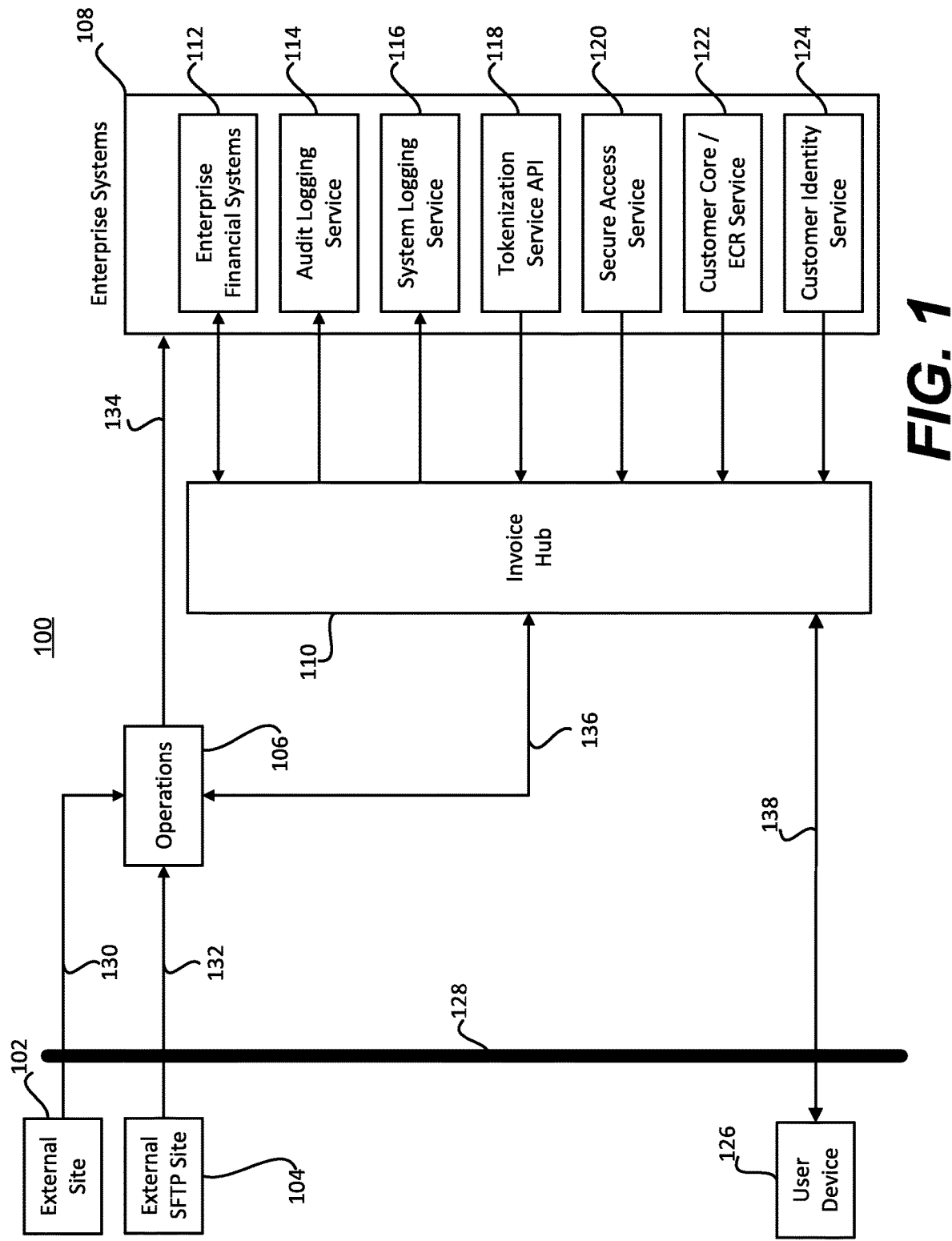
FIG. 1 shows a system with an Invoice Hub server and other servers and user devices according to an embodiment of the present disclosure.

Reference will now be made in detail to exemplary embodiments of the present disclosure, examples of which are illustrated in the accompanying drawings and described herein. In the drawings, like reference numerals are sometimes used to designate like structural elements. It should also be appreciated that the depictions in the figures are diagrammatic and not to scale.

Systems and methods for providing advanced invoice management by an Invoice Hub server are described below. The advanced invoice management systems and methods described in this disclosure provide a technological solution to an issue rooted in technology, including improved systems and methods for processing and analyzing disparate data in large volumes at scale from multiple sources. The disclosed techniques may be implemented to identify invoices for expedited processing based on various factors.

The Invoice Hub server may unconventionally utilize data from third party platforms, such as eInvoicing platforms, and provide an analytical information-based platform for managing invoices. For example, the Invoice Hub server may analyze rich data from third party platforms, including data on suppliers and buyers (e.g., a customer of a supplier), and the Invoice Hub server may analyze invoices relating to a supplier and a buyer, and identify correlating and corresponding relationships that have attractive payment characteristics, which may be indicative of relative risk.

The Invoice Hub server may include artificial intelligence (AI) or machine learning (ML) modules and systems for identifying relationships relating to invoices and for making decisions relating to invoices. The Invoice Hub server may provide funds for invoices having attractive payment characteristics, and may offer the funds for lower-risk invoices. The AI/ML modules and systems in the Invoice Hub server may analyze data from customers and/or third party platforms. Such analyzing of invoice data may include analyzing historical invoices, including information relating to such invoices, for example invoice amount, actual paid amount, invoice due date, actual date paid, and other information that may be included or associated with an invoice.

The AI/ML modules and systems may include logic for generating scores as to a supplier, a buyer, or for a particular invoice, and present such scores, for example a Buyer Payment Likelihood score and a Payment On-Time Likelihood score, to a customer through a customized and dynamic user interface. A user interface may be provided by the Invoice Hub server to provide invoice visibility to customers, and customers may review and select invoices to process, and filter invoices to identify invoices that may have more favorable terms for the customer. The Invoice Hub server may contain AI/ML for automatically identifying and selecting invoices to process for a supplier, as discussed in further detail in the present disclosure.

FIG. 1 is a block diagram of an exemplary network with the Invoice Hub server 110 according to an embodiment of the present disclosure. The network may include a firewall 128, or other device that limits external access to a network, that separates external networks, for example an external site 102, an external secured file transfer protocol (SFTP) site, and a user device 126 (running, e.g., on a local network, for example a home network), with an invoice processing network 100. Operations 106 may be part of invoice processing network 100, and invoice processing network 100 may also include enterprise systems 108.

External site 102 may be a third party that receives invoices based on a supplier-customer relationship. For example, a supplier and a customer (e.g., buyer) may enter into a contract, where the supplier agrees to provide goods to the customer. The supplier may generate an invoice through the third party, and the third party can track the invoice through payment from the customer. External SFTP site 104 may be a third party site for transferring invoice related data between the third party managing the external SFTP site 104 and operations 106. In some embodiments, the invoice related data may be directly transferred from external SFTP site 104 to Invoice Hub server 110.

User device 126 may be a smartphone, tablet, laptop computer, desktop computer, or other device configured to display information on a screen and access the invoice processing network. The user device 126 can access the invoice processing network through a user portal for example. The user device 126 may send user data and user requests to Invoice Hub server 110 through a network, for example the Internet, a public network, a private network, or combination thereof. The user data and/or user requests may pass through firewall 128 and be received by Internet Hub server 110, which can then process the user data or respond to a user request. While the network shown in FIG. 1 shows the user device 126 in communication with Invoice Hub device 110 through firewall 128, a network (not shown), and a communication path 138, other configurations are possible.

Operations 106 may include multiple user devices that may access Invoice Hub server 110 and enterprise systems 108. The user devices used for operations 106 may be similar to user device 126, and may be a smartphone, tablet, laptop computer, desktop computer, or other device configured to display information on a screen. Operations 106 includes a connection 134 to enterprise system 108 and a connection 136 to Invoice Hub server 110.

Enterprise systems may include various subparts, including enterprise financial systems 112, audit logging service 114, system logging service 116, tokenization service application programming interface (API), secure access service 120, customer core/efficient consumer response (ECR) service 122, and customer identity service 124. As shown in FIG. 1, Invoice Hub server communicates with enterprise systems 108, including with various subparts identified previously.

As mentioned above, Invoice Hub server 110 may communicate with any of enterprise system components 112 through 124. For example, Invoice Hub server 110 may send and receive information from enterprise financial systems 112. In some embodiments, Invoice Hub server 110 may send a request to enterprise financial systems 112 regarding a current financial performance of an existing customer (e.g., an SMB), and in response receive information that can be used for various purposes. In some embodiments, information received by the Invoice Hub server 110 from the enterprise financial systems 112 may be used to inform the approval of a customer, and a probability assessment of whether an invoice(s) will be approved and paid based on analysis performed by Invoice Hub server 110. In other embodiments, third party sites (including both internal and external sites) can be used to provide financial data to enterprise financial systems. The financial data from enterprise financial system 112 can be used for various purposes by Invoice Hub server 110, as described in this disclosure. In some embodiments, Invoice Hub server 110 may be configured to provide logic for automatically determining risk assessment (for both suppliers and possible buyers) using artificial intelligence or machine learning. Such automated processes are further described in this disclosure.

Figure 2:
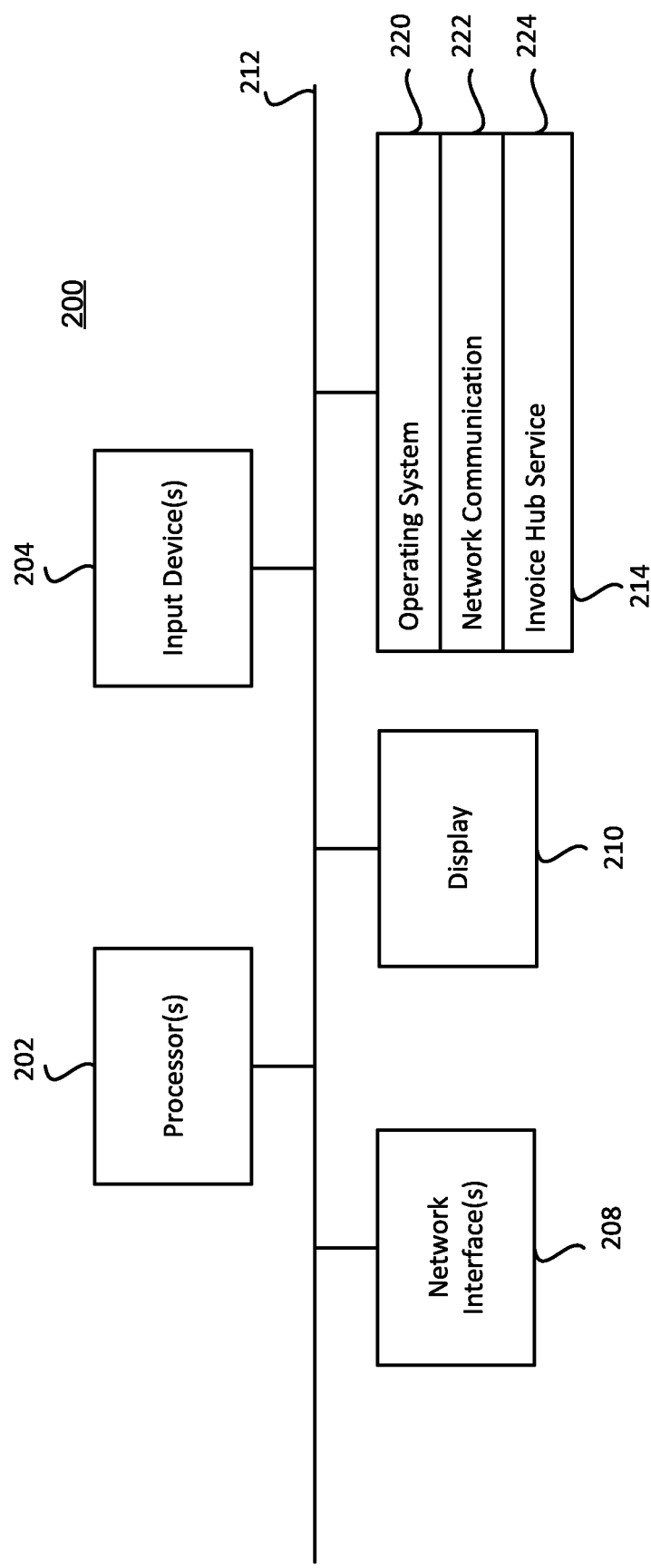
FIG. 2 shows an Invoice Hub Server according to an embodiment of the present disclosure.

FIG. 2 is a block diagram of an exemplary computing system 200 that may be provided as part of Invoice Hub server 110 that may implement various features and processes as described herein. The Invoice Hub server 110 may be implemented on an electronic device that runs software applications derived from compiled instructions, including without limitation personal computers and servers. In some implementations, the computing system 200 may include one or more processors 202, one or more input devices 204, one or more display devices 210, one or more network interfaces 208, and one or more computer-readable mediums 214. Each of these components may be coupled by bus 212.

In some embodiments, Invoice Hub server 200 may include one or more processors 202, one or more network interfaces 208, and one or more computer-readable mediums 214, and may be accessed, for example for maintenance, by an external device, such as a personal computer. The Invoice Hub service 224 may include logic for performing the various methods and processes described herein. Display device 210 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology used for exchanging communications, for example ISA, EISA, PCI, PCI Express, NuBus, USB, Serial ATA and FireWire. Computer-readable medium 214 may be any medium that participates in providing instructions to processor(s) 202 for execution, including without limitation, non-volatile storage media, such as optical disks, magnetic disks, flash drives, etc., or volatile media, such as SDRAM and ROM.

Computer-readable medium 214 may include various instructions 220 for implementing an operating system, for example a server operating system software. The operating system may be multi-user and include multiprocessing, multitasking, multithreading, real-time, and other capabilities. The operating system may perform basic tasks, including but not limited to recognizing input from input device(s) 204, sending output to display device 210, maintaining files and directories on computer-readable medium 214, controlling peripheral devices (e.g., disk drives, printers, etc.) that may be controlled either directly or through an I/O controller, and managing traffic on bus 212. Network communications instructions 222 may establish and maintain network connections (e.g., software for implementing communication protocols, such as TCP/IP, HTTP, Ethernet, telephony, etc.).

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language, for example Objective-C, Java, Swift, and C++, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

One or more features or steps of the disclosed embodiments may be implemented using an API. An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Figure 3:
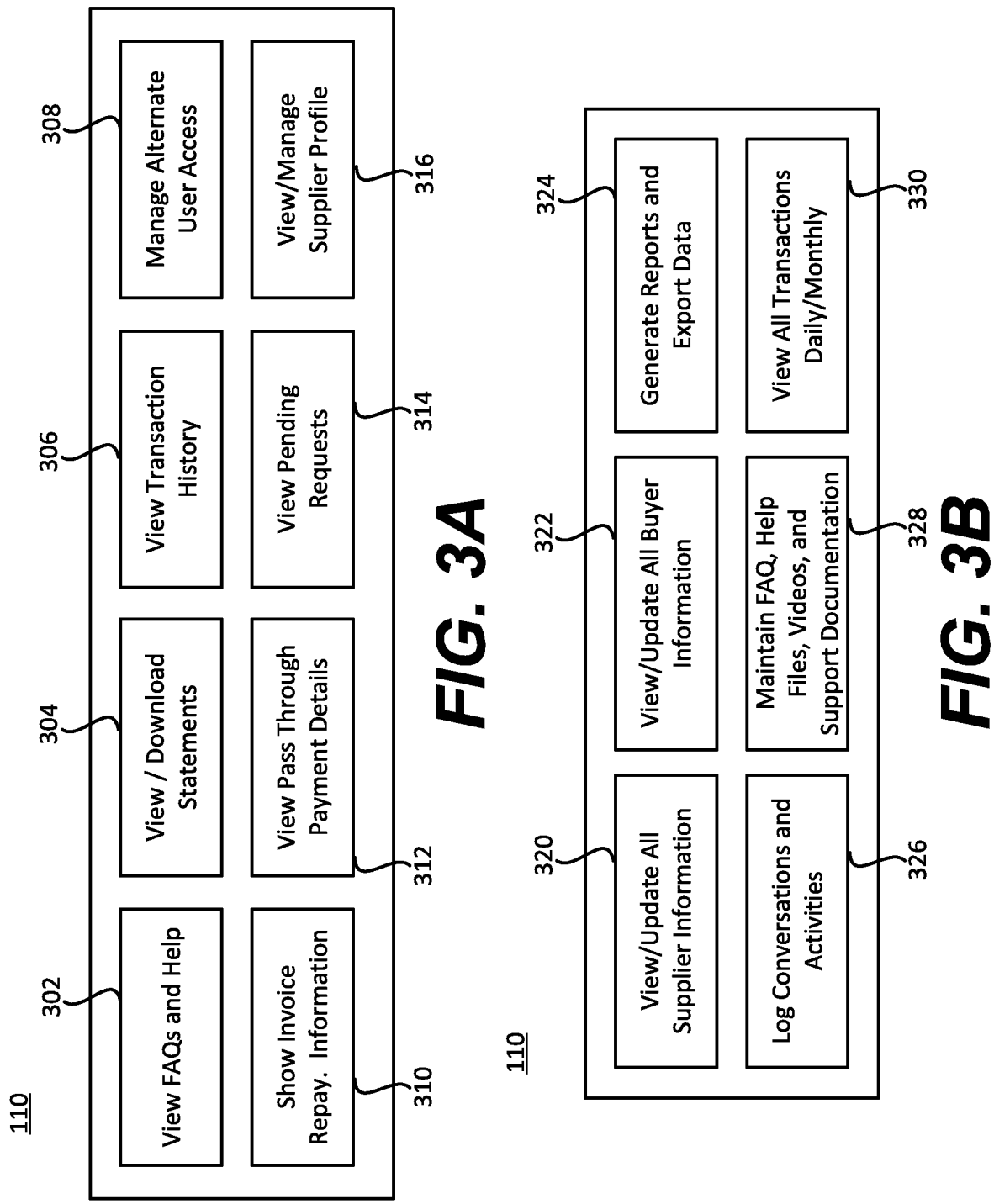
FIGS. 3A and 3B show technological features of the Invoice Hub server according to an embodiment of the present disclosure.

FIG. 3A is a block diagram that shows various features of the Invoice Hub server 110 in accordance with an embodiment of the present disclosure. In FIG. 3A, Invoice Hub server 110 may be configured to enable a supplier to interact with the Invoice Hub server to perform various actions relating to digital invoice processing. For example, a supplier may access client services through a customer API of the Invoice Hub server, and may access client services such as viewing invoice statements 304, viewing the transaction history of an invoice 306, managing alternate user access 308, for example to enable another individual employed by the supplier to access the Invoice Hub server, displaying invoice repayment information 310, viewing pass-through-payment details 312, viewing pending requests 314, and managing the supplier profile 316. Invoice Hub server may also perform actions relating to assisting a user through FAQs and other help features 302. In some embodiments, a supplier may be able to access more, or fewer, client services shown in FIG. 3A.

FIG. 3B is a block diagram that shows various features of the Invoice Hub server 110 in accordance with an embodiment of the present disclosure. In FIG. 3B, Invoice Hub server 110 may be configured to enable an operator to interact with the Invoice Hub server to perform various actions relating to digital invoice processing. For example, an operator may access system services through a back office API of the Invoice Hub server 110, and may access system services such as viewing and/or updating supplier information 320, viewing and/or updating buyer information 322, generating reports and exporting data 324, logging conversations and activities 326, maintaining support documentation 328, and viewing daily, monthly, and/or annual transactions 330. In some embodiments, an operator may be able to access more, or fewer, system services shown in FIG. 3B.

Figure 4:
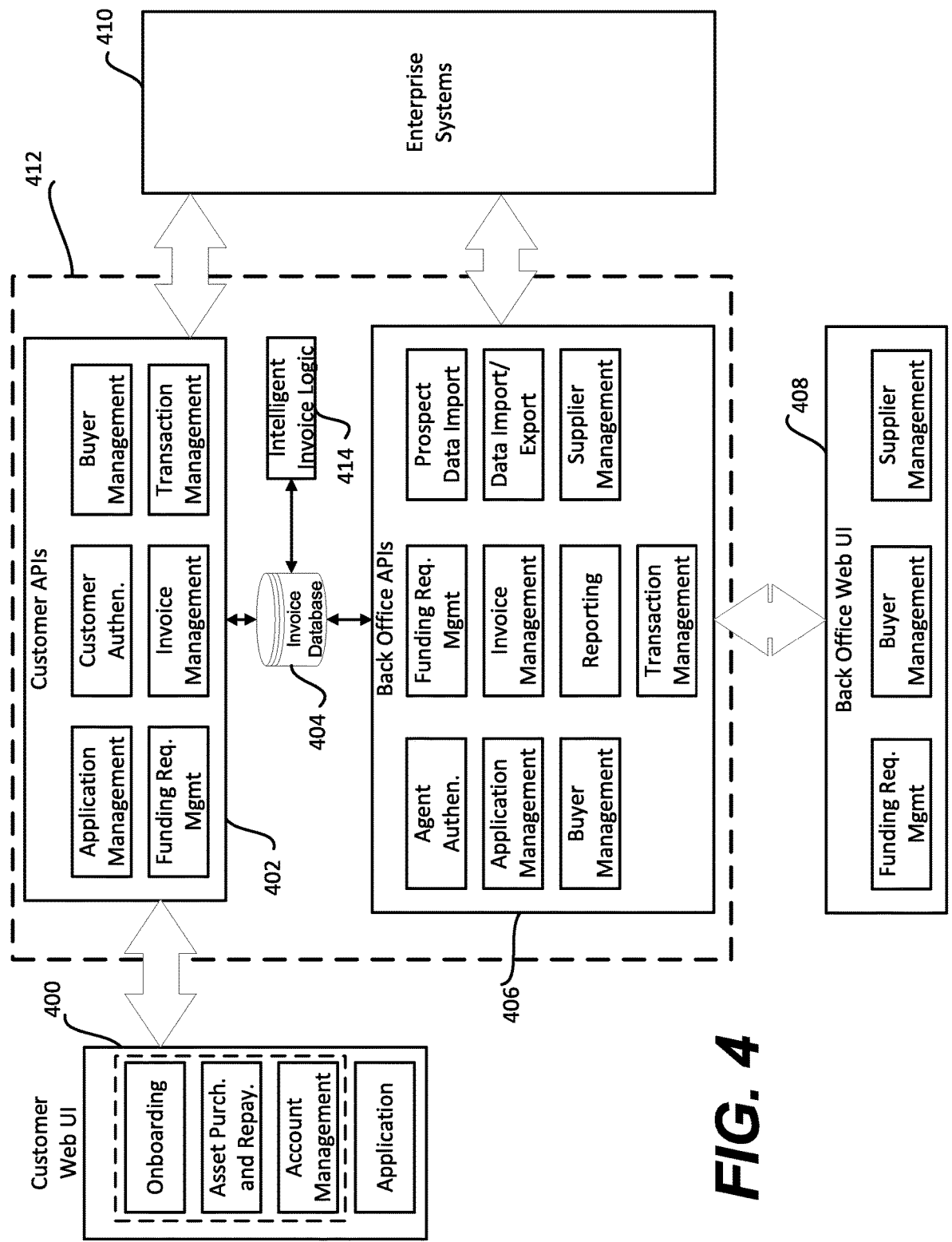
FIG. 4 shows a system with an Invoice Hub server and other customer and enterprise systems according to an embodiment of the present disclosure.

FIG. 4 is a block diagram showing an Invoice Hub server 412 in accordance with an embodiment of the present disclosure. Invoice Hub server 412 may correspond to Invoice Hub server 110. Invoice Hub server 412 may include various APIs, including customer APIs 402 and back office APIs 406. Customer APIs 402 may be accessed by customer web user interface (UI) 400, and back office APIs may be accessed by back office web UI 408. Invoice Hub server 412 may also communicate with enterprise systems 410. Enterprise systems 410 may include one or more subparts, for example one or more of the subparts shown in FIG. 1, and each of customer APIs 402 and back office APIs 406 of Invoice Hub server 412 may communicate with enterprise system, including through APIs on enterprise systems 410 or through other modes of communication. Invoice Hub server 412 may include an invoice database 404, and both customer APIs 402 and back office APIs 406 may access invoice database 404.

Customer APIs 402 may include various APIs, including an application management API, a customer authentication API, a buyer management API, a funding request management API, an invoice management API, and a transaction management API. In some embodiments, the APIs shown in customer APIs 402 may be consolidated into a single API, or may be broken out into further APIs. The customer APIs 402 may be used for accessing various features of the Invoice Hub sever, including customer authentication, buyer management (e.g., data relating to a relationship between a customer and a buyer, including past, current, and future invoices), requesting and accessing information relating to funding of, e.g., invoices, managing one or more invoices for one or more buyers, and for managing transactions, such as changing invoice-related information.

Back office APIs 408 may include various APIs, including an agent authentication API, a funding request management API, a prospect data import API, an application management API, an invoice management API, a data import/export API, a buyer management API, a reporting API, a supplier management API, and a transaction management API. In some embodiments, the APIs shown in back office APIs 406 may be consolidated into a single API, or may be broken out into further APIs. The back office APIs 408 may be used for individuals to provide similar functions as customer APIs 402, and may also be used for supplier management (e.g., data relating to a relationship between the operator of Invoice Hub server and one or more suppliers).

Invoice database 404 may store information relating to invoice processing. For example, invoice database 404 may store parameters describing an invoice, and may include a data structure for enabling the artificial intelligence logic of the Invoice Hub server to efficiently and dynamically determine information relating to one or more invoices associated with a supplier. In some embodiments, the data structure may store information relating to invoices paid over time by a buyer of a supplier, information for determining high priority invoices based on the payment schedule of invoice (s) associated with a supplier, and may store information enabling the Invoice Hub server 412 to perform the methods and processes described herein.

Invoice Hub server 412 may include intelligent invoice logic 414, and the intelligent invoice logic 414 may contain artificial intelligence (AI) or machine learning (ML) intelligence. Intelligent invoice logic 414 may be in communication with invoice database 404 to access information pertaining to invoices. The intelligent invoice logic 414 may analyze data from invoice database 404 for actionable purposes, for example to identify invoices that may have favorable payment characteristics. Intelligence invoice logic 414 may analyze data from invoice database 404 and generate new data that may be used for various purposes. For example, intelligent invoice logic 414 may create new data for comparing to future invoices submitted from a third party (e.g., an eInvoicing platform), and intelligently prioritize invoices based on data generated by intelligent invoice logic 414. In some embodiments, intelligent invoice logic may be in communication with the customer APIs 402 and the back office APIs 406, and the invoice server APIs 402/406 may be used to interact with invoice database 404.

Intelligent invoice logic 414 of Invoice Hub server 412 may generate data relating to invoice processing, and in some embodiments, the generated data may be stored in invoice database 404. For example, intelligent invoice logic 414 may generate an invoice score that may be given for an invoice associated with a supplier and a buyer. The invoice score may be generated by AI/ML logic included in intelligent invoice logic 414, and may include factors such as a payment schedule of the invoice, an expected return of the invoice, historical payment history of a buyer (a customer of the supplier), and a credit score of a supplier. The supplier credit score may be based on several factors, including a credit line provided to the supplier, the amount of credit that the supplier is using of the credit line, remaining credit available to the supplier, and the total value of open invoices assigned to the supplier. For example, a supplier with a high credit score (e.g., with a high credit limit and low credit usage) may result in a higher invoice score, and may depend on other factors, including factors relating to a buyer. Additional factors may be considered by the intelligent invoice logic 414 for generating the invoice score. The intelligent invoice logic 414 may also include an invoice score threshold that can be compared to an invoice score, the invoice score associated with an invoice that is associated with a supplier and a buyer. The invoice score threshold can be a predetermined threshold, or in some embodiments, the threshold is determined by intelligent invoice logic 414. In some embodiments, the remaining credit available is similar to an advance limit, such that if a supplier requests payment of an invoice that exceeds the credit limit (e.g., a maximum invoice value), advance payment of the invoice may be approved only to the advance limit.

In some embodiments, intelligent invoice logic 414 of Invoice Hub server 412 may evaluate various historical factors relating to invoices associated with a customer or a buyer. For example, if a new customer registers with Invoice Hub server 412, intelligent invoice logic 414 may analyze a payment history of a buyer associated with an invoice of the new customer to identify new customer invoices that may be selected for expedited processing. Analyzing a payment history of a buyer may include intelligent logic for searching sources containing business information on buyers, for example stock price information, financial reports, future value estimations, and other information in order to develop buyer profiles. As some buyers may have stronger credit history than other buyers, intelligent invoice logic 414 may create and maintain buyer profile scores that may be included in analysis of invoices to consider for advance payment. In some embodiments, analyzing a payment history may include analyzing tens, hundreds, thousands, or even greater amounts of invoice histories, including information relating to such invoices, to identify trends, including trends with one or more suppliers (or types of suppliers for example). Over time, as more payment information is received and processed by Invoice Hub server 412, the ability of Invoice Hub server 412 to identify favorable invoices for advance payment may greatly increase. The analysis of payment information may also be used to identify trends (e.g., late payments being made in certain parts of the year) that can be used in determining whether an invoice qualifies for an advance payment, the amount that should be advanced, and other factors as described in the present disclosure.

A user interface option may allow the new customer to select that invoice, even after only a short time period passing between when the new customer registered with the Invoice Hub server and the request to process an invoice. In some embodiments, the intelligent invoice logic 414 may continue to analyze payment trends over time, and may automatically adjust the availability of invoices that a new customer may be able to select, if for example the buyer's repayment trends favorably or unfavorably over time.

The intelligent invoice logic 414 may also include logic for comparing a buyer's treatment of various suppliers, including one or more suppliers registered with the Invoice Hub server. For example, if a buyer pays a certain supplier more consistently than other suppliers within the buyer's network, the AI/ML of the intelligent invoice logic may take such factors into consideration as to whether invoices associated with a supplier should be considered for processing, or expedited processing for example.

Figure 5:
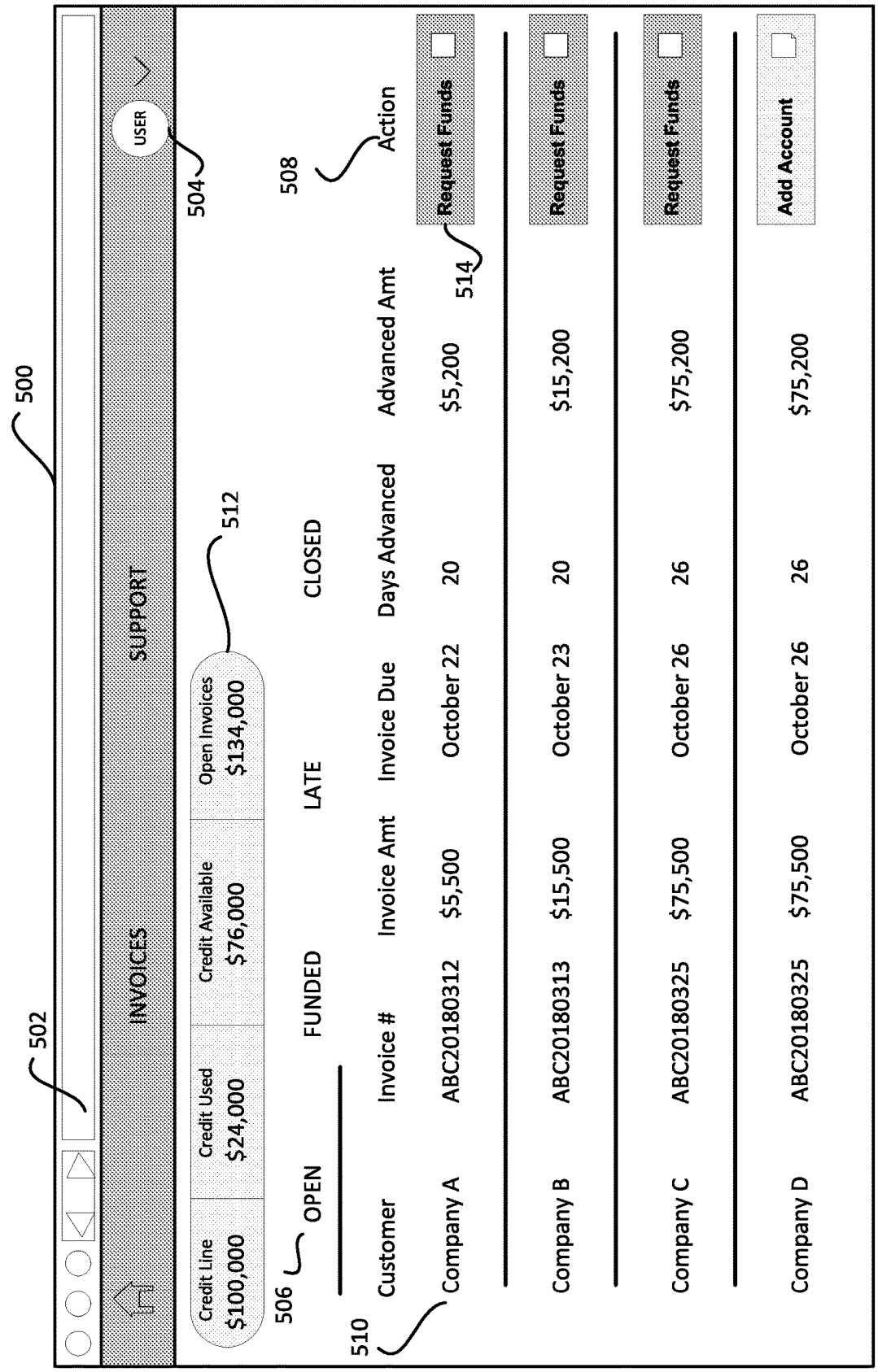
FIG. 5 shows a user interface for enabling a customer to interact with the Invoice Hub server and for perform actions done by the Invoice Hub server according to an embodiment of the present disclosure.

In some embodiments, the intelligent invoice logic includes AI/ML for automatically adjusting pricing and product characteristics associated with an invoice. The automatic pricing adjustment may be based on, for example, various factors relating to a buyer, a supplier, and a transaction history between the buyer and the supplier. The logic may be further extended to consider other suppliers within a buyer's network for invoice processing, or other buyers within a supplier's network, for example. In some embodiments, an underlying interest rate, for example an interest rate similar to an annual percentage rate (APR), may be automatically adjusted for certain invoices based on one or more factors, including factors relating to payment history. The AI/ML of intelligent invoice logic 414 may be used to identify less risky transactions in providing a favorable interest rate for example. In some embodiments, as discussed further below and as shown in FIG. 5, the advanced amount may be automatically adjusted by intelligent invoice logic. For example, if a transaction between a buyer and a seller is identified as less risky, the advanced amount identified by the intelligent invoice logic may be greater. In other embodiments, the invoice due date could be adjusted based on one or more factors associated with an invoice, or based on other factors relating to a buyer or a supplier. For example, a buyer with a history of consistently paid invoices, but with a history of missing initial invoice due dates, may be granted automatic extended grace periods.

In some embodiments, intelligent invoice logic performs a dynamic assessment of a customer (e.g., a supplier). The dynamic assessment may be used to automatically adjust the advance limit associated with a customer, and may be automatically increased or decreased based on various factors. Some factors may include for example the number of unpaid invoices, the number of invoices unpaid after a due date, the total advanced amount, as well as other factors relating to an invoice as described in this disclosure.

FIG. 5 is a user interface for enabling a customer, for example a supplier or a customer of the supplier (e.g., a buyer), to interact with an exemplary Invoice Hub server 110/412 and to request data from, or to submit requests to, the Invoice Hub server, according to an embodiment of the present disclosure. FIG. 5 shows user interface window 500, an address bar 502, for entering a URL for example, and information displayed within window 500 relating to a supplier and one or more invoices. In some embodiments, the interface shown in FIG. 5 may be modified for display on a mobile phone or other user interface environment, for example a tablet device. For example, certain data fields, described in further detail below, may or may not be displayed in a modified UI, depending on data fields identified by a customer for display. The modified UI could include data fields for tracking the status of an invoice, or the modified UI could include data fields and action buttons for enabling a user to perform an action relating to an invoice.

The window 500 shown in FIG. 5 includes various elements, including a user profile selector 504, an invoice status selector 506, invoice information descriptor 508, an invoice entry descriptor 510, a supplier credit and invoice descriptor 512, and an action selector 514.

The user profile selector 504 may allow a user to select a user profile relating to the supplier. For example, if the supplier has supplied multiple individuals with credentials to access the Invoice Hub server, an individual affiliated with the supplier may be able to access the individual's profile by selecting the user profile selector 504. Selecting the user profile selector 504 may allow display of all user profiles associated with the supplier, and may allow the individual affiliated with the supplier to select the individual's user profile. In response, the Invoice Hub server may present a user interface that includes invoices assigned to that individual, including one or more invoice entry descriptor 510 based on the number of invoices assigned to the individual. The invoice status selector 506 enables a user to navigate between invoices that are either in an OPEN, FUNDED, LATE, and CLOSED state. In some embodiments, there may be additional invoice statuses, such that more options appear in the invoice status selector 506, and in some embodiments, there may be fewer invoice statuses, such that fewer options appear in the invoice status selector 506.

Invoice information descriptor 508 may include information describing an invoice, and may include a customer name, an invoice identifier (e.g., an invoice number), an invoice amount, an invoice due date, a days advanced, an advanced amount, and an action identifier. Invoice information descriptor 508 may be displayed as the header of a user interface displayed using multiple columns, where each column corresponds to the customer name, the invoice identifier, the invoice amount, the invoice due date, the days advanced, the advanced amount, and the action identifier.

Invoice entry descriptor 510 may display invoice-specific information, and include one or more of a specific customer name, invoice identifier, invoice amount, invoice due date, days advanced, and advanced amount. For example, the first row in FIG. 5 shows an entry of 'ABC20180312' for an invoice identifier. This may represent a unique identifier of an invoice, invoice 'ABC20180312.' The entry 'Company A' may represent that Company A is the customer (i.e., the customer of a supplier), the entry '$5,500' may represent the total amount of the invoice, the entry 'October 22' may represent the due date of that invoice, the entry '20' may represent the number of days advanced of the invoice, the entry '$5,200' may represent the actual amount of the invoice that was advanced, and the entry 'Request Funds' may enable a user to send a request to a customer (i.e., a supplier's customer) requesting payment of an invoice amount. For example, a request for payment of an invoice may be requested by the user. In some embodiments, the Invoice Hub server automatically sends a request for payment of an invoice, for example the invoice amount shown in FIG. 5, to the customer (e.g., providing notice to a customer that an invoice is eligible for advance payment), and in some embodiments, sends a prioritized list of invoices that are eligible for advance payment. In the user interface of FIG. 5, for example, more favorable invoices may be displayed in the first row (or the initial rows), and in some embodiments user interface elements may be used to highlight an invoice that may be considered more or less favorable for advance payment. In some embodiments, the Invoice Hub server sends the request based on the days advanced value and/or the invoice due date relating to an invoice identifier.

The supplier credit and invoice descriptor 512 may provide information relating to the credit of a supplier, and may provide information relating to invoices relating to the supplier. The supplier credit and invoice descriptor 512 may include a credit line descriptor, a credit used descriptor, a credit available descriptor, and an open invoices descriptor. In some embodiments, the credit line descriptor represents the total amount of credit provided to the supplier by the Invoice Hub server, the credit used descriptor represents the portion of credit used, the used credit relating to the total amount of credit provided to the supplier, the credit available descriptor represents the remaining amount of credit available, the remaining credit relating to the total amount of credit provided to the supplier and the used credit, and an open invoices descriptor. In some embodiments, the open invoices descriptor represents a total value of invoices that have been processed by the Invoice Hub server. In some embodiments, the credit available descriptor is similar to an advance limit. For example, if a supplier requests payment of an invoice that exceeds the amount shown in the credit available descriptor (e.g., a maximum invoice value), advance payment of the invoice may be approved only to the advance limit.

The window 500 of FIG. 5 may include the various user interface elements shown, including the address bar 502, the user profile selector 504, the invoice status selector 506, the invoice information descriptor 508, the invoice entry descriptor 510, the supplier credit and invoice descriptor 512, and the action selector 514. In some embodiments, the window 500 may include additional user interface elements, for example a search field to search for an invoice based on one or more of the user interface elements shown in FIG. 5, and a selected funding descriptor that provides a monetary value based on the number of action selector 514 elements that have been selected by the user. In some embodiments, the window 500 may include fewer user interface elements than that shown in FIG. 5.

The user interface shown in FIG. 5 may also be used to display other information, including a Buyer Payment Likelihood score and a Payment On-Time Likelihood score. In some embodiments, the Invoice Hub server may determine a score identifying the likelihood (e.g., a percent or value) that a buyer may provide payment based on one or more factors. Such a score may be displayed in window 500. In some embodiments, the Invoice Hub server may determine a score identifying the likelihood (e.g., a percent or value) that a buyer may repay an invoice payment on time. Such a score may be displayed in window 500. Other information relating to an invoice may be displayed in window 500, depending on for example whether the user interface is displayed on a browser of a laptop or desktop computer, or if the user interface is displayed on a mobile device. The AI/ML of Invoice Hub server 110/412 may include logic for determining a Buyer Payment Likelihood score and a Payment On-Time Likelihood score. The Invoice Hub server 110/412 may process invoice related information received from one or more third parties. The AI/ML logic for determining such scores may include weighting particular periods of time, for example assigning greater weight to consistent and full payments for more recent time periods (e.g., a month, half-year, or year), that may be used in determining such scores. Other metrics may be used in determining the score, for example a buyer profile score as described in the present disclosure. Over time, interfaces with additional third parties may be added in order for Invoice Hub server to access additional data sources containing invoice and related data, including historical invoice information (i.e., invoices not originally processed by Invoice Hub server). With more data, the Buyer Payment Likelihood score and a Payment On-Time Likelihood score (as well as other potential scores) may become more accurate as the Invoice Hub server accesses and/or stores more invoice related data.

The invoice entry descriptor 510 may be configured to display in different manners. For example, in some embodiments, invoices with a more favorable interest rate (e.g., which may be determined based on the advanced analytics for determining the Buyer Payment Likelihood score or the Payment On-Time Likelihood score) may be displayed first (i.e., in the first row or in the first several entries). The invoice entry descriptor 510 may be scrollable, such that a supplier with many invoices may be able to view all invoices by scrolling down in the user interface.

In some embodiments, user interfaces to a customer may include editable fields. A customer may view invoice information in a read-only user interface, and select a button or icon for accessing one or more invoices in an editable mode. In such a mode, the customer may be able to request changes to information describing the invoice (i.e., flag one or more invoice characteristics), for example a days advanced, invoice due date, advanced amount, etc. In this manner, it may be possible for a customer to negotiate an advance payment of an invoice, or to change information relating to an invoice that present more favorable terms to either the customer or the entity controlling the Invoice Hub server.

While an example of a user interface is shown in FIG. 5, other possible user interfaces may be provided to a user (e.g., a supplier, a customer, or an employee of an entity having ownership of the Invoice Hub server). For example, a calendar option may be presented to a user, such that the user may be presented in a calendar view of when payments are expected. The calendar user interface may show a month-by-month, or week-by-week analysis of expected or past payments.

Another example user interface may include presenting a window displaying expected withdrawals or payments from/into an account over time, such that an estimated value of an account may be identified and presented to a user.

Another example user interface may include linking to a banking account of a customer (e.g., a supplier), and enabling the customer to access a user interface where the customer can select an invoice to process, drag the invoice to a bank account symbol (the bank account associated with the customer), and release the invoice while interacting with the bank account symbol. In such embodiments, the Invoice Hub server may immediately submit a request to transfer funds associated with the invoice to the bank account of the supplier. Additional logic may be included at Invoice Hub server to delay, alert, or notify the customer of a failure to deposit funds associated with an invoice to the bank account.

Another example user interface may include a Payment Assurance option displayed in window 500, or displayed in user interfaces of other embodiments. The Payment Assurance feature may be used for example when a customer selects a Payment Assurance icon or soft button. If the customer selects that action, then if the buyer pays the invoice past the due date, the Invoice Hub server may initiate a payment to the supplier and notify the buyer that payment of the invoice is to be directed to Invoice Hub server.

Figure 6:
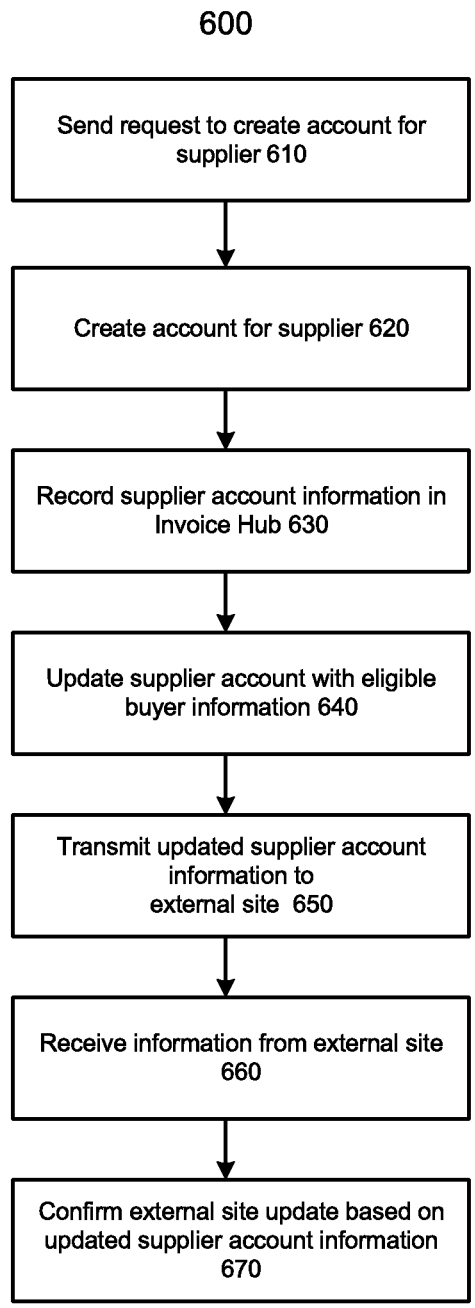
FIG. 6 shows an Invoice Hub server registration process according to an embodiment of the present disclosure.

FIG. 6 shows an Invoice Hub server registration process according to an embodiment of the present disclosure. The registration process may be performed by a combination of the Invoice Hub server (e.g., 110/412) and an external site (e.g., a server controlled by a third party). In some embodiments, the registration process is performed by a user device in combination with the Invoice Hub server.

At step 610, the Invoice Hub server receives a request to create an account for a supplier. This step may be performed before any data relating to invoices issued by a supplier are received from a third party, for example an external SFTP site or other site for transferring data between networks. In some embodiments, an external site sends the request to create an account for a supplier, and in some embodiments, a user device sends the request.

At step 620, the Invoice Hub server creates an account for supplier. In some embodiments, the Invoice Hub server may create the supplier account before any invoice related data is received from a third party (e.g., a server controlled by a third party), and in some embodiments, the Invoice Hub server may create the supplier account contemporaneously, or in close proximity, to receiving data relating to an invoice from a third party. In some embodiments, the customer may include an interface, such that the Invoice Hub server may be able to import or access invoice records from a device within customer's control and ownership, and in other embodiments the customer stores invoice information with a third party, and the third party provides the interface such that Invoice Hub server can import or access invoice data. Depending on the amount of historical invoice data stored within a source, it may be advantageous to prefer interfacing with either the customer invoice system or a third party invoice system for importing and/or accessing invoice data relating to the customer.

At step 630, a notice relating to creation of the supplier account may be transmitted to an external site, for example a server controlled by a third party. In some embodiments, the notice may be sent at a later point in time, for example when a user profile is created, and in other embodiments, the Invoice Hub server may not send a notice.

At step 640, the Invoice Hub server updates the supplier account to include eligible buyer information. For purposes of the present disclosure a "buyer" may refer to a customer of a supplier. Similarly, a "customer" may refer to a customer of the supplier, or alternatively the supplier is the customer of the entity managing the Invoice Hub server. In some embodiments, eligible buyer information may include a buyer name, a buyer identifier, and other information that can be used by the Invoice Hub server to identify relationships between a buyer (i.e., a customer of a supplier) and a supplier. The buyer identifier may be a unique identifier when there are multiple buyers with the same buyer name. In some embodiments, intelligent invoice logic 114 may be configured to analyze invoice data to identify relationships/correlations between buyers and/or differences to identify and distinguish between distinct buyer entities.

Steps 650, 660, and 670 may be performed by a combination of the Invoice Hub server and an external site (e.g., a server controlled by a third party) for purposes of exchanging information relating to the process of establishing supplier and buyer data in the Invoice Hub server. In some embodiments, this information is needed for the Invoice Hub to perform the features and processes described herein. In some embodiments, historical invoice information may be imported and/or accessed by the Invoice Hub server, including for example payment information, interest rate, date of payment, and other information relating to an invoice. For buyers that have extensive invoice histories or submit significant numbers of invoices, the customer and/or third party data sources may well exceed millions of invoice records.

Figure 7:
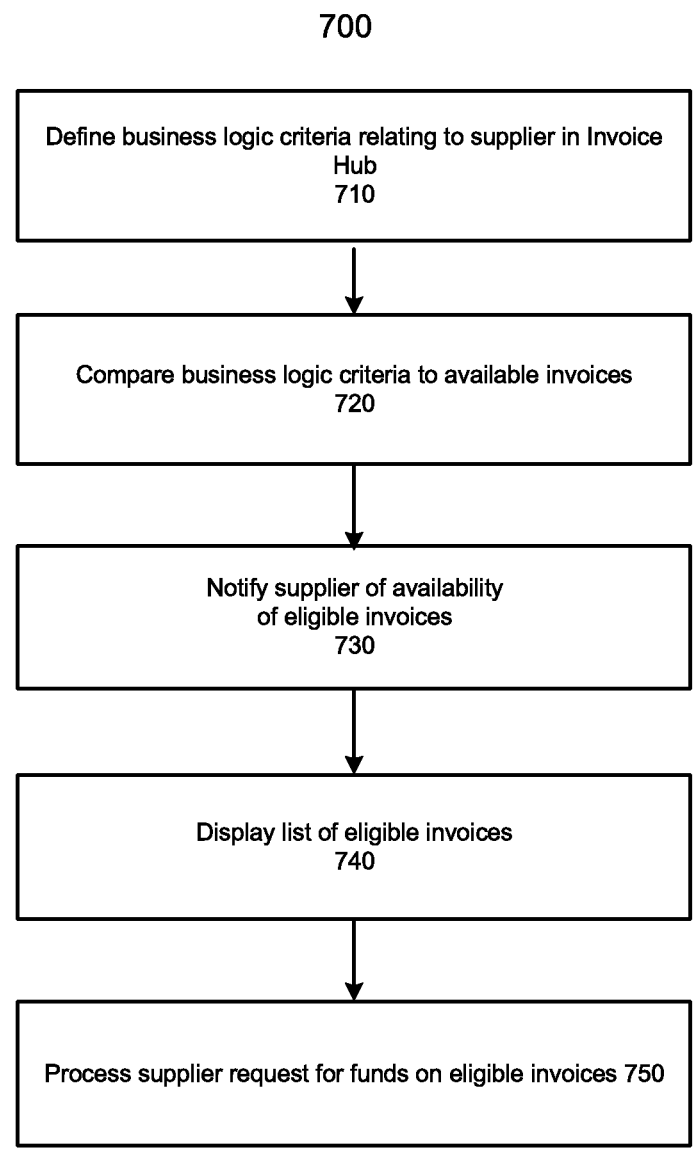
FIG. 7 shows an Invoice Hub server invoice identification and processing method according to an embodiment of the present disclosure.

FIG. 7 shows an Invoice Hub server invoice identification and processing method according to an embodiment of the present disclosure. The Invoice Hub server (e.g., 110/412) may be used to perform the steps of the process shown. In some embodiments, one or more APIs relating to the Invoice Hub server may be used to perform the steps of the process shown.

At step 710, the Invoice Hub server generates business logic rules relating to a supplier. The business logic criteria may describe one or more criteria or conditions and may be used to define relationships between multiple invoices received by the Invoice Hub server from, for example, an external site. In some embodiments, a user profile associated with a supplier may be used to send the business logic criteria to the Invoice Hub server, where the Invoice Hub server may process and store the business logic criteria. In other embodiments, the Invoice Hub server may include artificial intelligence to define business logic criteria based on invoices submitted by a supplier. The artificial intelligence may identify business logic criteria based on prior behavior of the supplier, or may identify business logic criteria based on suppliers having a similar industry profile. For example, certain industries may have a stronger record of, e.g., full payment or payment on time, whereas other industries, for example startup companies in the technology sector, including emerging technologies, may not have an established invoice history to identify relevant business logic criteria. In some embodiments, the advance payment options provided to a supplier or customer may vary, depending on the industry profile.

In some embodiments, the supplier may define business logic criteria, and artificial intelligence at the Invoice Hub may modify the business logic criteria based on one or more intelligent criteria, where such intelligent criteria may include payment history of a buyer (i.e., a customer of the supplier), the total number of invoices submitted by a supplier, and market profile descriptors of a buyer related to the supplier. On some embodiments, the artificial intelligence in the Invoice Hub server may consider other intelligent criteria, in addition to the intelligent criteria identified above.

At step 720, the Invoice Hub server compares business logic criteria to invoices that have been submitted to the Invoice Hub server by a supplier. In some embodiments, the Invoice Hub server, including artificial intelligence located at the Invoice Hub server, may modify the business logic criteria based on one or more intelligent criteria before comparing the modified business logic criteria to the available invoices. One benefit of updating the business logic criteria before comparing the business logic criteria to available invoices is that additional invoices may become available for processing by the Invoice Hub server.

At step 730, a supplier is notified of the availability of advance eligible invoices, for example invoices that may be immediately processed, such that the supplier may receive an advance payment (compared to when the supplier would expect to receive payment from the buyer). In some embodiments, this is done in response to a request for information from a user device, the user device associated with a user profile further associated with the supplier. In other embodiments, Invoice Hub server may notify the supplier that previously ineligible invoices are available for advance payment and processing.

At step 740, a supplier requests information on eligible invoices from the Invoice hub server, and the Invoice Hub server provides a list of eligible invoices that may be displayed to the user. In some embodiments, the Invoice Hub server may perform this request in response to a request for eligible invoice information from a supplier. In other embodiments, the Invoice Hub server may generate a report and send information relating to eligible invoices to the supplier.

At step 750, the Invoice Hub server processes the supplier request to process eligible invoices. In some embodiments, a supplier may select a single eligible invoice to process, and in other embodiments, the supplier may select multiple (or all) eligible invoices to process. In some embodiments, the Invoice Hub server may send an advance payment request to an enterprise financial systems.

Figure 8:
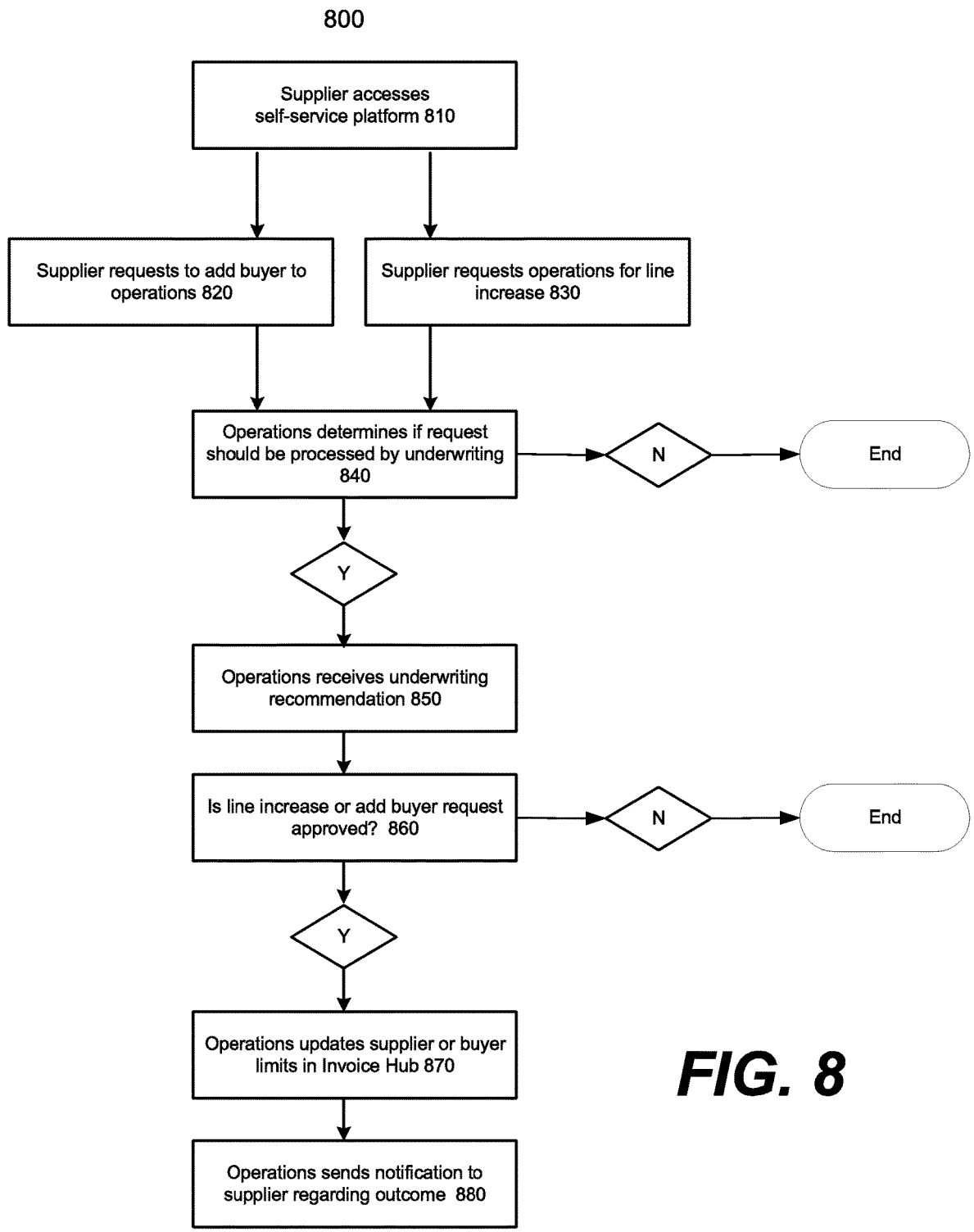
FIG. 8 shows a supplier profile update process according to an embodiment of the present disclosure.

FIG. 8 shows a supplier profile update process according to an embodiment of the present disclosure. The Invoice Hub server may be used to perform the steps of the process shown. In some embodiments, an operator may perform certain steps of the process shown.

At step 810, a supplier accesses a self-service platform. The self-service platform may be presented through a customer API accessible through the Invoice Hub server. Steps 820 and 830 are presented as optional steps. At step 820, a supplier requests to add a buyer to the Invoice Hub server. At step 830, a supplier requests to increase the amount of credit (e.g., a line increase). In some embodiments, a supplier may send a request relating to step 820 and a request relating to step 830 in any particular order. In some embodiments, the Invoice Hub server contains artificial intelligence for automatically determining an amount of a credit increase. The amount of the credit increase may be related to business logic criteria, and the Invoice Hub server may use intelligent criteria described herein to automatically determine an amount of a credit increase. For example, the Invoice Hub server may analyze the payment history of one or more buyers associated with a supplier, and based on that analysis, automatically increase the supplier's credit.

In some embodiments, step 840 may be done by an operator. The operator may determine whether a request (i.e., a request to add a buyer at step 820 or a request to increase an amount of credit at step 830) should be processed. If the operator determines that the request should not be processed, then the process ends. In some embodiments, the Invoice Hub server may send a notice to the supplier that a request has been denied. In some embodiments, the operator may determine that the request should be processed, and may send the request to underwriting. In some embodiments, underwriting is performed by a third party, in some embodiments underwriting is performed by a group relating to the entity managing the Invoice Hub server, and in other embodiments, the Invoice Hub server may be configured to execute logic for determining whether the supplier's request should be approved.

At step 860, if the request is denied, then the process ends. If the request is approved, then in some embodiments, an operator updates the supplier credit increase or adds a buyer associated with the supplier in Invoice Hub server. In some embodiments, the Invoice Hub server may make the determination as to whether a buyer should be added or whether the supplier should be granted a credit increase, and may update the supplier's information accordingly. In some embodiments, if the operator sends a request to update Invoice Hub server, the operator may send a notification to the supplier regarding the outcome of the supplier's request. In other embodiments, the Invoice Hub server may automatically send a notification to the supplier regarding the supplier's request.

Figure 9:
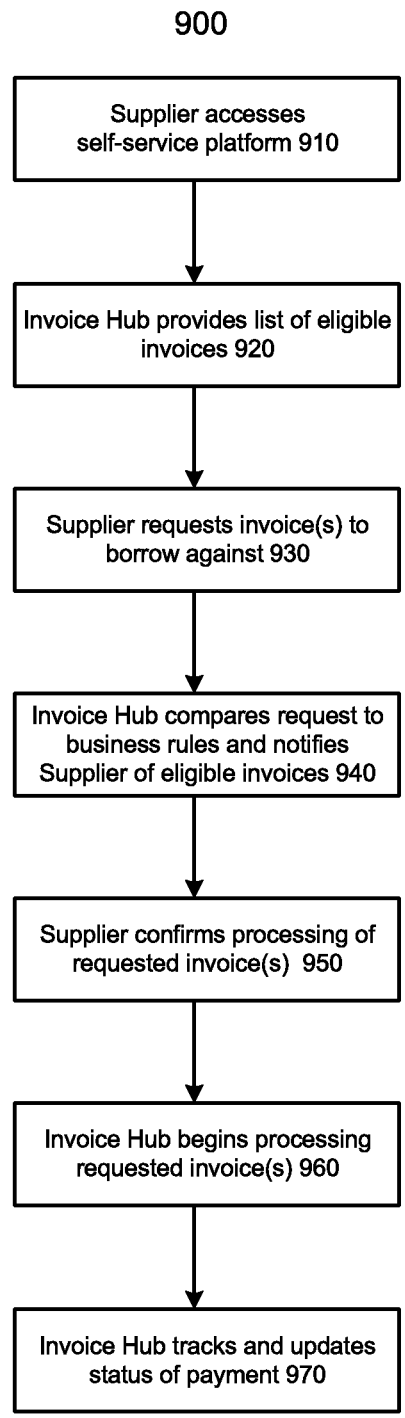
FIG. 9 shows an Invoice Hub server invoice identification and processing method according to an embodiment of the present disclosure.

FIG. 9 shows an Invoice Hub server invoice identification and processing method according to an embodiment of the present disclosure. The Invoice Hub server (e.g., 110/412) may be used to perform the steps of the process shown.

At step 910, a supplier accesses a self-service platform. The self-service platform may be presented through a customer API (e.g., 420) accessible through the Invoice Hub server.

At step 920, the Invoice Hub server may provide a list of eligible invoices to the supplier. The list of eligible invoices may be displayed through a customer API, either alone or through a customer web UI. In some embodiments, the Invoice Hub server may apply business logic criteria, as described herein, to invoices associated with the supplier and identify eligible invoices that may be presented to the supplier.

At step 930, the supplier identifies an invoice to borrow against. In some embodiments, the supplier may select more than one invoice to borrow against, and in some embodiments the supplier may select all eligible invoices to borrow against. In some embodiments, the Invoice Hub server may apply business logic criteria to determine if all eligible invoices may be selected, and if the Invoice Hub server determines that all eligible invoices may be selected, the Invoice Hub server may enable a display that allows the supplier to select all eligible invoices for payment. In determining which invoices to process, the supplier may be able to compare eligible invoices, including for example an advanced amount, an invoice due date, and a credit available limit. Some invoices may have terms more favorable to a supplier, for example invoices associated with a more credit worthy buyer. User interfaces generated at least in part by Invoice Hub server, for example the user interface shown in FIG. 5, enables more intelligent decision making to be done by the supplier based on the analysis performed by Invoice Hub server.

In some embodiments, the Invoice Hub server can apply business logic criteria in response to a supplier selection of an eligible invoice. The Invoice Hub server, in response to applying the business logic criteria, may then modify the user interface displayed to the user, so that the supplier may not be able to select invoices that were previously eligible, and became ineligible as a result of the supplier selecting certain invoices for payment.

At step 940, the Invoice Hub server compares the request to borrow against one or more eligible invoices to business logic criteria. The Invoice Hub server may notify the supplier of eligible invoices based on applying the business logic criteria to the request for payment of one or more eligible invoices. In some embodiments, supplier confirmation may be required before any payment of an eligible invoice may begin. This is shown for example at step 950.

At step 960, the Invoice Hub server begins processing the requested invoice(s). As described herein, in some embodiments, a request to send a payment to the supplier may be handled by an operator, and in other embodiments, the Invoice Hub server submits the request to a payment system, for example an enterprise financial system.

At step 970, the Invoice Hub server tracks the status of an advance payment to a supplier, and updates the status. In some embodiments, the advance payment may be denied, for example if the invoice is determined to be based on an erroneous or fraudulent invoice. In other embodiments, after payment has been confirmed, the Invoice Hub server may update the status of the invoice so that a supplier can tell whether an invoice has been paid.

In addition to the benefits and advantages described previously, the Invoice Hub server provides other benefits. For example, the Invoice Hub server may utilize existing buyer and supplier relationships in order to reduce the risk of fraudulent payments. Buyers may include safeguards (or controls) to prevent payment of funds to a fraudulent party, and the Invoice Hub server may utilize such controls to prevent fraudulent individuals from being accepted as genuine.

The Invoice Hub server may include logic for initiating a purchase of the account of a supplier (e.g., an asset purchase), thereby shifting the credit risk from SMBs to a buyer. Generally, buyers include less credit risk than a supplier, or SMBs in general, and the Invoice Hub server, using logic described in the present disclosure, may analyze large amounts of data from multiple sources in order to shift credit risk from, e.g., an SMB to a more credit-worthy buyer.

The term "advance payment" generally refers to an advancement on the expected payment for an invoice. For example, if a supplier invoices a buyer for a transaction, an advance payment may be made on the invoiced amount or a portion of the invoiced amount. In some embodiments, a supplier (or customer) may waive a portion of an invoice submitted to a buyer in order to obtain a payment for a portion of the invoice, and the full invoiced amount may be recouped or collected through the Invoice Hub server.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

What is claimed is:

1. A method comprising:
providing an invoice interface to multiple third party invoice systems, wherein each system interacts with an invoice hub server through the invoice interface;
receiving, at the invoice hub server, a plurality of open invoices directly from the third party invoice system, wherein each of the plurality of open invoices is associated with a transaction between a supplier and a buyer, and wherein each of the plurality of invoices comprises at least a buyer identifier associated with the buyer, a supplier identifier associated with the supplier, and an invoice amount;
identifying one or more supplier invoices from the plurality of open invoices, the supplier invoices relating to the same supplier;
receiving, at the invoice hub server, a supplier preference associated with at least one of the supplier invoices, the supplier preference designating at least one or more supplier invoices for advance processing;
analyzing, by machine-learning (ML) logic at the invoice hub server, the designated one or more supplier invoices for advance processing, the analyzing further comprising:
automatically generating an invoice score for each of the designated one or more supplier invoices, each invoice score based on at least a supplier score, a buyer score, and a payment schedule of a respective invoice;
automatically identifying an invoice score threshold based on at least a supplier score, a buyer score, and a historical payment history of the buyer; and
automatically comparing each of the generated invoice scores to the invoice score threshold to identify one or more invoices eligible for advance processing, wherein the one or more eligible invoices have an invoice score that exceeds the invoice score threshold;
generating, by the invoice hub server, an indication identifying the one or more eligible invoices available for advance processing; and
responsive to receiving selection of one or more of the eligible invoices, automatically transmitting an advance payment to the supplier based on the selected eligible invoices.

2. The method of claim 1, wherein the invoice score is further based on an available amount of a credit line associated with the supplier.

3. The method of claim 1, wherein the advance payment for the one or more selected eligible invoices matches the invoice amount corresponding to at least one of the plurality of open invoices.

4. The method of claim 1, wherein the advance payment for the one or more selected eligible invoices is less than the invoice amount corresponding to at least one of the plurality of open invoices.

5. The method of claim 1, further comprising calculating, by the ML logic,
the invoice score threshold based on an advanced amount value relating to a total amount advanced for the one or more supplier invoices from the plurality of open invoices.

6. The method of claim 1, wherein the invoice score is generated based on each of the supplier score, the buyer score, and the payment schedule of the respective invoice.

7. The method of claim 1, wherein generating the invoice score further comprises:
assigning a weighting score to the supplier score, the buyer score, or the payment schedule of a respective invoice;
analyzing at least one of a historical supplier score over a defined time period, a historical buyer score over the defined time period, or a historical payment history of the supplier over the defined time period;
assigning a weighting score to the one of the historical supplier score, the historical buyer score, or the historical payment history; and
generating the invoice score based on the weighted supplier score, the weighted buyer score, or the weighted payment schedule, and the weighted historical supplier score, the weighted historical buyer score, or the weighted historical payment history.

8. A method comprising:
providing an invoice interface to multiple third party invoice systems, wherein each system interacts with an invoice hub server through the invoice interface;
receiving, at the invoice hub server, a plurality of open invoices directly from the third party invoice system, wherein each of the plurality of open invoices is associated with a transaction between a supplier and a buyer, and wherein each of the plurality of invoices comprises at least a buyer identifier associated with the buyer, a supplier identifier associated with the supplier, and an invoice amount;
identifying one or more supplier invoices from the plurality of open invoices, the supplier invoices relating to the same supplier;
analyzing, by a machine-learning (ML) server in communication with the invoice hub server, the one or more supplier invoices relating to the same supplier, the analyzing further comprising:
automatically generating an invoice score for each of the one or more supplier invoices relating to the same supplier, each invoice score being based on at least a supplier score, a buyer score, and a payment schedule of a respective invoice; and
automatically determining an advance payment amount for each of the one or more supplier invoices relating to the same supplier based on one or more of the respective invoice scores, wherein the advance payment amount correlates directly to one or more of the one or more invoice scores;
generating, by the invoice hub server, an indication identifying each of the one or more supplier invoices relating to the same supplier and the respective advance payment amounts;
receiving selection of one or more of the supplier invoices relating to the same supplier after generating the indication; and
automatically transmitting an advance payment to the supplier based on the selected invoices.

9. The method of claim 8, further comprising receiving at the invoice hub server a supplier preference associated with at least one of the supplier invoices, the supplier preference designating at least one or more supplier invoices for advance processing, wherein the ML server analyzes the one or more supplier invoices based on the one or more supplier invoices designated for advanced processing.

10. The method of claim 8, wherein the advance payment for at least one respective supplier invoice matches the invoice amount corresponding to the respective supplier invoice.

11. The method of claim 8, wherein each invoice score is generated based on each of the supplier score, the buyer score, and the payment schedule of the respective invoice.

12. The method of claim 8, further comprising:
responsive to receiving information relating to the supplier, analyzing the received information, by the ML server;
automatically adjusting the invoice score for each of the one or more supplier invoices relating to the same supplier; and
responsive to adjusting the invoice score, automatically adjusting the advance payment amount for each of the one or more supplier invoices relating to the same supplier based the respective adjusted invoice score.

13. The method of claim 12, further comprising transmitting a notification to the supplier associated with the selected one or more supplier invoices, the notification indicating the respective adjusted advance payment amounts.

14. A system comprising:
an invoice hub server comprising machine-learning (ML) logic, one or more processors, and a non-transitory memory, the memory storing instructions that, when executed by the processor, cause the processor to perform processing comprising:
receiving, from an invoice interface accessible to each of multiple third party invoice systems, a plurality of open invoices, wherein each of the plurality of open invoices is associated with a transaction between a supplier and a buyer, and wherein each of the plurality of invoices comprises at least a buyer identifier associated with the buyer, a supplier identifier associated with the supplier, and an invoice amount;
identifying one or more supplier invoices from the plurality of open invoices, the supplier invoices relating to the same supplier;
receiving a supplier preference associated with at least one of the supplier invoices, the supplier preference designating at least one or more supplier invoices for advance processing;
analyzing, by instructions associated with the ML logic, the designated one or more supplier invoices for advance processing, the analyzing further comprising:
automatically generating an invoice score for each of the designated one or more supplier invoices, each invoice score based on at least a supplier score, a buyer score, and a payment schedule of a respective invoice;
automatically identifying an invoice score threshold based on at least a supplier score, a buyer score, and a historical payment history of the buyer; and
automatically comparing each of the generated invoice scores to an invoice score threshold to identify one or more invoices eligible for advance processing, wherein the one or more eligible invoices have an invoice score that exceeds the invoice score threshold;
generating an indication identifying the one or more eligible invoices available for advance processing; and
automatically transmitting an advance payment to the supplier based on the one or more eligible invoices, wherein the advance payment is transmitted to the supplier responsive to a selection of one or more of the eligible invoices.

15. The system of claim 14, wherein the advance payment for the one or more selected eligible invoices matches the invoice amount corresponding to at least one of the plurality of open invoices.

16. The system of claim 14, wherein the instructions further cause the processor to perform processing comprising calculate the invoice score threshold based on an advanced amount value relating to a total amount advanced for the one or more supplier invoices from the plurality of open invoices.

17. The system of claim 14, wherein the invoice score is generated based on each of the supplier score, the buyer score, and the payment schedule of the respective invoice.

18. The system of claim 14, wherein the invoice score threshold is dynamically determined by the ML logic during analyzing of the designated one or more supplier invoices for advance processing.

* * * * *